(12) United States Patent  (10) Patent No.: US 8,749,829 B2
Teshima  (45) Date of Patent: Jun. 10, 2014

(54) IMAGE FORMING SYSTEM WHICH FORMS AN IMAGE BY RASTER IMAGE PROCESSOR PROCESSING FOR PRINT DATA, AND CONTROL METHOD FOR THE SAME

(75) Inventor: Katsunori Teshima, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 64 days.

(21) Appl. No.: 13/482,115

(22) Filed: May 29, 2012

(65) Prior Publication Data

US 2012/0307297 A1  Dec. 6, 2012

(30) Foreign Application Priority Data

May 31, 2011 (JP) .................................. 2011-121716

(51) Int. Cl.
*G06K 15/02* (2006.01)
(52) U.S. Cl.
USPC ............................. 358/1.15; 358/1.1; 358/401
(58) Field of Classification Search
USPC ................. 358/1.1, 1.13, 1.15, 400, 401, 296
See application file for complete search history.

(56) References Cited

U.S. PATENT DOCUMENTS

| 5,438,433 A * | 8/1995 | Reifman et al. ............... 358/468 |
| 8,130,394 B2 * | 3/2012 | Matsuda ....................... 358/1.15 |
| 2007/0139700 A1 * | 6/2007 | Sekiya et al. ................. 358/1.15 |
| 2008/0297830 A1 * | 12/2008 | Sewell et al. ................. 358/1.15 |
| 2012/0057201 A1 * | 3/2012 | Tsukamoto .................... 358/1.15 |
| 2012/0099151 A1 * | 4/2012 | Kurihara ....................... 358/1.15 |
| 2012/0099152 A1 * | 4/2012 | Kamata ......................... 358/1.15 |
| 2012/0281252 A1 * | 11/2012 | Chen ............................ 358/1.15 |

FOREIGN PATENT DOCUMENTS

| JP | 2004-348181 A | 12/2004 |
| JP | 2009-198409 A | 9/2009 |
| JP | 2009-278484 A | 11/2009 |

OTHER PUBLICATIONS

Japanese Office Action dated Aug. 6, 2013 (and English translation thereof) in counterpart Japanese Application No. 2011-121716.

* cited by examiner

*Primary Examiner* — Thomas D Lee
(74) *Attorney, Agent, or Firm* — Holtz Holtz Goodman & Chick PC

(57) ABSTRACT

An image forming system configured to execute RIP processing for print data not subjected to the RIP processing so as to produce image data, and to form an image based on the image data, includes a plurality of image forming apparatuses which are coupled in tandem, and each of which is assigned to form an image on one of regions of an recording sheet, wherein the plurality of image forming apparatuses include first and second image forming apparatuses, the first image forming apparatus is configured to execute the RIP processing for the print data so as to produce the image data, and the second image forming apparatus is configured to supply the image data produced by the RIP processing in the first image forming apparatus to each of the plurality of image forming apparatuses in synchronization with a timing of image formation in each of plurality of image forming apparatuses.

6 Claims, 8 Drawing Sheets

IMAGE FORMING SYSTEM WHICH FORMS AN IMAGE BY RASTER IMAGE PROCESSOR PROCESSING FOR PRINT DATA, AND CONTROL METHOD FOR THE SAME

BACKGROUND OF THE INVENTION

1. Field of the Invention

The present invention relates to an image forming system configured to execute RIP (Raster Image Processor) processing for print data not subjected to the RIP processing so as to produce image data and to form an image based on the image data, and further relates to a control method for the image forming system. In this specification, "processing by a raster image processor" is simply referred to as "RIP processing".

2. Description of Related Art

A tandem image forming system includes a plurality of image forming apparatuses which are coupled in tandem.

In such a tandem image forming system, an image is formed on some region on an image recording sheet by an image forming apparatus, successively, the image recording sheet is input to another image forming apparatus, and another image is formed on another region of the image recording sheet by the another image forming apparatus.

According to this image forming system, by two image forming apparatuses, images are formed on an obverse surface and reverse surface of a recording sheet, whereby images can be output at high speed.

Further, two image forming apparatuses may be controlled to form images separately with respective different color toners, whereby high-definition images can be formed. Furthermore, two image forming apparatuses may be differently assigned to either one of a character region and an image region so as to form an appropriate image, whereby high-definition images can be formed.

In an image forming system having a plurality of image forming apparatuses, in order to produce image data by processing print data described with a page description language by a RIP, a CPU in an image forming apparatus can execute the RIP processing without installation of a device exclusively used for the RIP processing.

With regard to a technique to execute the RIP processing in an image forming system having a plurality of image forming apparatuses, Japanese Unexamined Patent Publication No. 2009-198409 proposes such a technique.

In a tandem image forming system having two image forming apparatuses, if each of the two image forming apparatuses executes the RIP processing, problems arise in that images formed by the two image forming apparatuses do not become uniform. Accordingly, in the technique disclosed by the above patent publication, the RIP processing is executed by only one of the two image forming apparatuses.

SUMMARY OF THE INVENTION

In the technique disclosed by the above patent publication, one of the two image forming apparatuses is assigned to execute the RIP processing and to control image formation based on image data produced by the RIP processing. Here, when the RIP processing and the image formation are executed successively for multiple jobs, a timing to execute the image formation for a certain job may overlap with a timing to execute the RIP processing for the next job.

At this time, the one of the two image forming apparatuses is executing, simultaneously in parallel, multiple processes, such as read-out of print data from a storage section for the RIP processing, write-in of image data produced by the RIP processing, and read-out of image data of each page for image formation.

Accordingly, if a timing to execute image formation for a certain job overlaps with a timing to execute the RIP processing for the next job, the processes may be late depending on the capability of the storage section for the required data transfer speed. As a result, the capability for image formation may decrease.

In such a case, it may be possible to deal with the above problems by increasing the number of HHDs in the storage section so as to increase the processing capability. However, another problem may arise in increase of cost.

The present invention has been achieved in view of the above problems, and in an image forming system having a plurality of image forming apparatuses coupled in tandem, one object of the present invention is to attain an image forming system which does not decrease an image forming capability at the time of production of image data by executing RIP processing for print data not subjected to the RIP processing and formation of image based on the produced image data, and another object is to attain a control method for the image forming system.

In order to attain at least one of the above objects, an image forming system into which one aspect of the present invention is reflected, and which executes RIP processing for print data not subjected to the RIP processing so as to produce image data and forms an image based on the image data, includes:

a plurality of image forming apparatuses which are coupled in tandem, and each of which is assigned to form an image on one of regions of an recording sheet, wherein the plurality of image forming apparatuses include first and second image forming apparatuses, the first image forming apparatus is configured to execute the RIP processing for print data not subjected to the RIP processing so as to produce image data, and the second image forming apparatus is configured to supply the image data produced by the RIP processing in the first image forming apparatus to each of the plurality of image forming apparatuses in synchronization with a timing of image formation in each of the plurality of image forming apparatuses.

In order to attain at least one of the above objects, in a control method of an image forming system into which one aspect of the present invention is reflected, wherein the image forming system is configured to execute RIP processing for print data not subjected to the RIP processing so as to produce image data, and to form an image based on the image data, and has a plurality of image forming apparatuses which are coupled in tandem and include first and second image forming apparatuses, and each of which is assigned to form an image on one of regions of an recording sheet, the control method includes the steps of:

executing the RIP processing for print data not subjected to the RIP processing so as to produce image data by the first image forming apparatus, and supplying the image data produced by the RIP processing in the first image forming apparatus to each of the plurality of image forming apparatuses in synchronization with a timing of image formation in each of plurality of image forming apparatuses by the second image forming apparatus.

In the image forming system and the control method, it is desirable that the image data produced by the RIP processing in the first image forming apparatus are transferred from the first image forming apparatus to the second image forming apparatus in a unit of a job being a unit of image formation in a series of image formation.

In the image forming system and the control method, it is desirable that the second image forming apparatus stores the image data produced by the RIP processing in a storage section, reads out the image data of a page consistent with a timing to form an image in each of the image forming apparatuses from the storage section, and supplies the image data to an image forming section of each of the image forming apparatuses.

DETAILED DESCRIPTION OF THE INVENTION

Hereafter, with reference to drawings, embodiments for implementing the present invention will be described.

Here, description will be made for an image forming system in which a plurality of image forming apparatuses are coupled serially in tandem such that each image forming apparatus is assigned to form an image on either one of obverse and reverse surfaces or one of regions in one page in a recording sheet, and for a control method in this image forming system.

<Structure of an Image Forming System>

Figure 1:
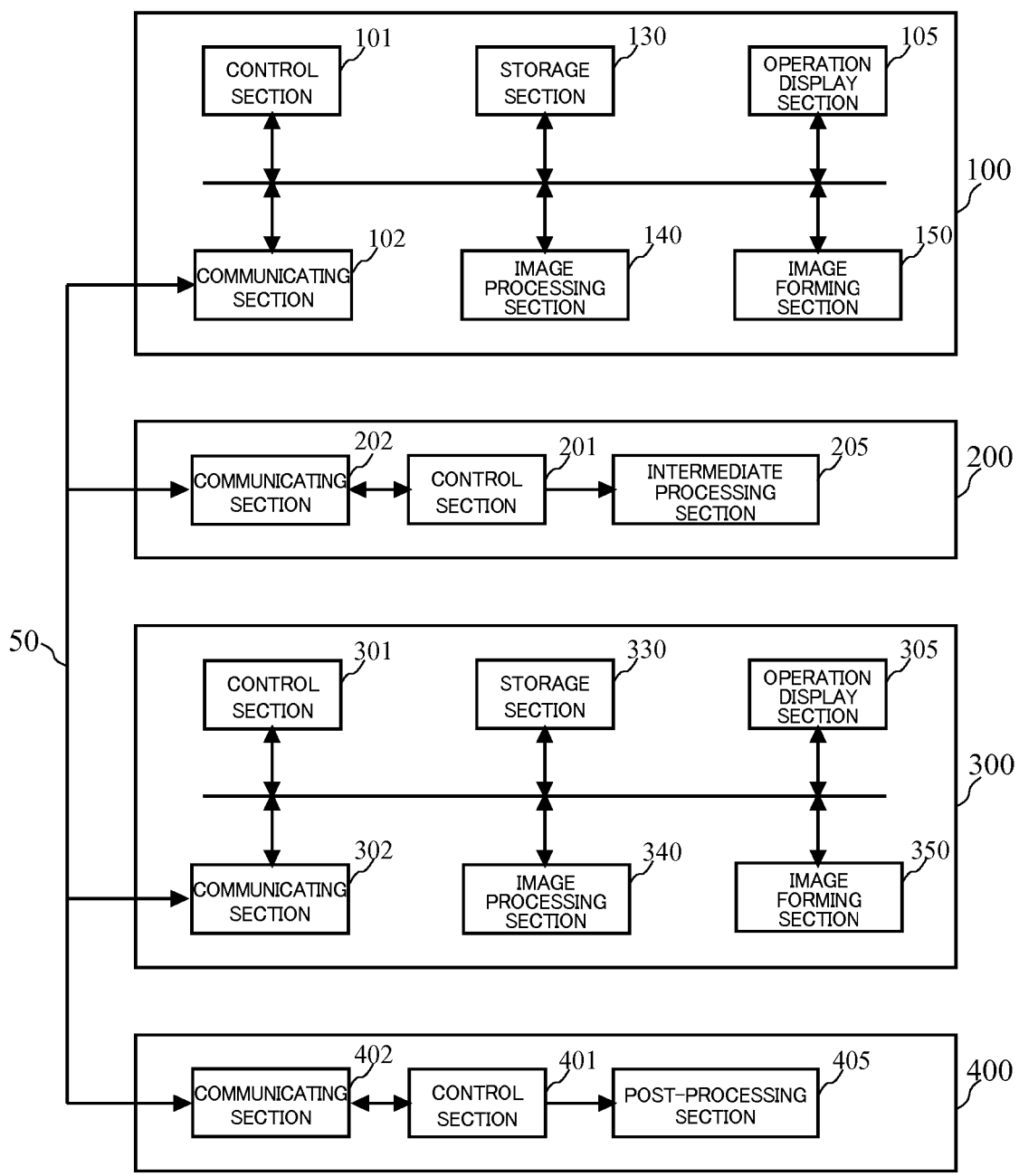
FIG. 1 is a block diagram showing a structure of an image forming apparatus in one embodiment of the present invention.
Figure 2:
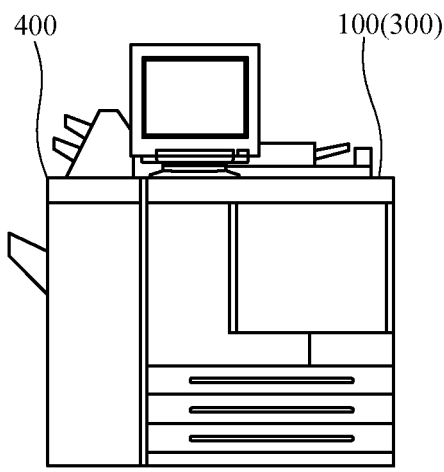
FIG. 2 is a configuration diagram showing a structure of an image forming apparatus in the embodiment of the present invention.
Figure 3:
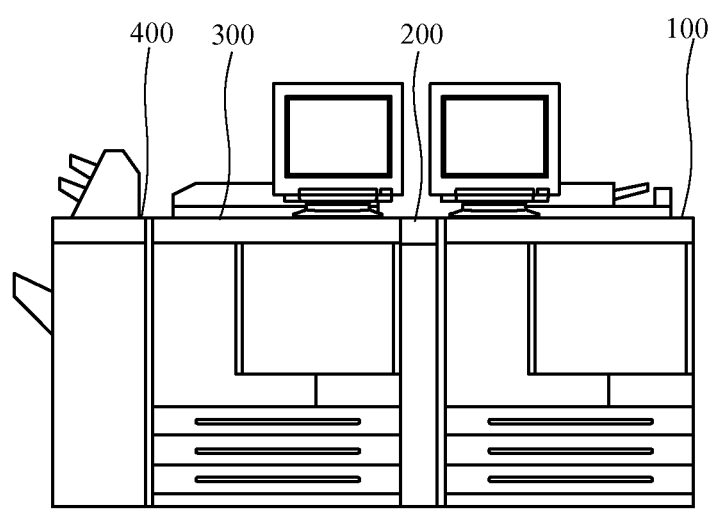
FIG. 3 is a configuration diagram showing a structure of an image forming apparatus in the embodiment of the present invention.

With reference to FIGS. 1 to 3, as one embodiment of the present invention, description will be given for an image forming system in which as the plurality of image forming apparatuses, an image forming apparatus 100 and an image forming apparatus 300 are coupled serially such that each image forming apparatus is assigned to be able to form an image on either one of obverse and reverse surfaces or one of regions in one page in a recording sheet.

Here, as a specific example, the description shows the case when two image forming apparatuses of the image forming apparatus 100 and the image forming apparatus 300 are coupled serially. However, three or more image forming apparatuses may be coupled serially.

Further, the image forming apparatus 100 and the image forming apparatus 300 may be used independently as shown in FIG. 2.

In the case shown by FIG. 2, a post-processing apparatus 400 is coupled to the subsequent stage of the image forming apparatus 100 or the image forming apparatus 300. In the state shown by FIG. 2, the image forming apparatus 100 or the image forming apparatus 300 is used independently.

As an image forming system of a series tandem system type, as shown in FIG. 3, the image forming apparatus 100 and the image forming apparatus 300 are serially coupled along a flow direction of a recording sheet from the right to the left in FIG. 3.

In the image forming system in FIG. 3, an image is formed on some region of a recording sheet by the image forming apparatus 100 at the precedent stage, then successively, the recording sheet is introduced to the image forming apparatus 300 located at the subsequent stage, and another image is formed on another region of the recording sheet by the image forming apparatus 300 at the subsequent stage.

Figure 4:
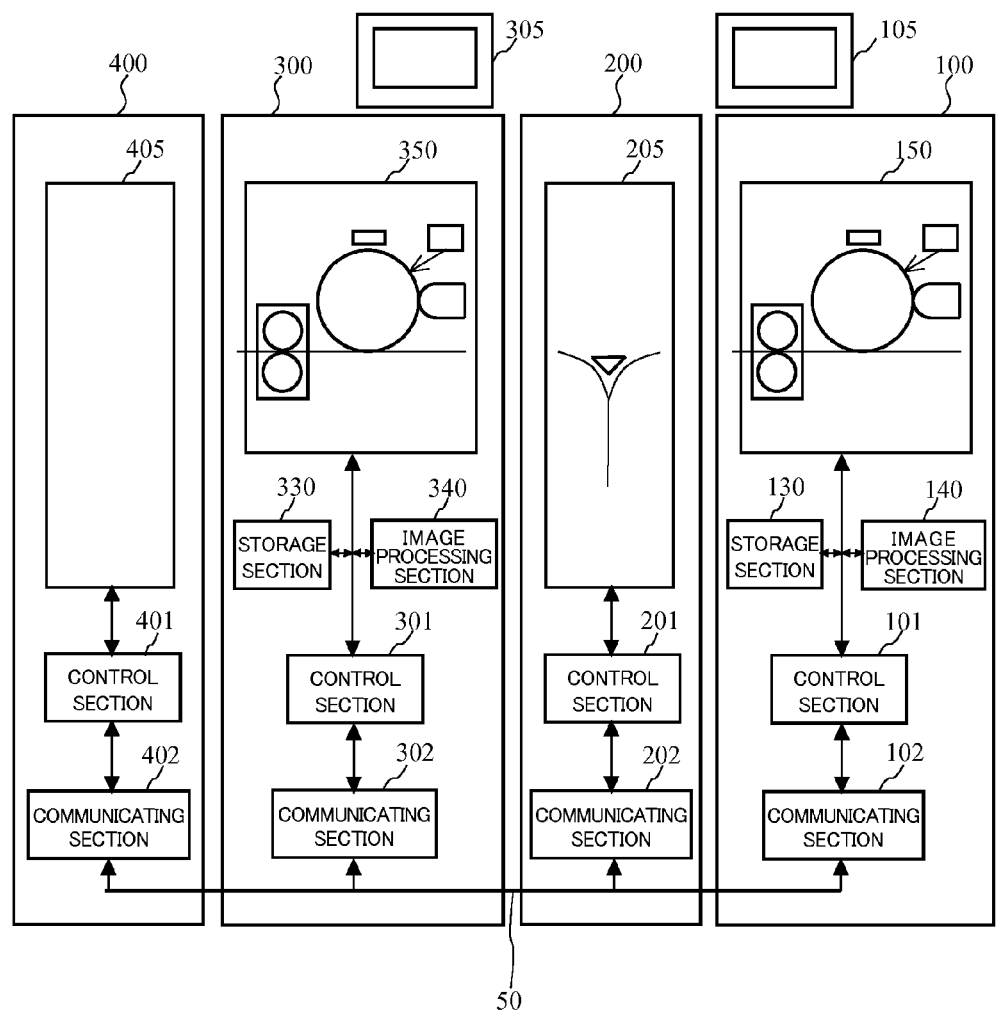
FIG. 4 is a configuration diagram showing a structure of the image forming apparatus in the embodiment of the present invention.

Here, as shown in FIG. 1, FIG. 3, and FIG. 4, the image forming apparatus 100, an intermediate processing apparatus 200, the image forming apparatus 300, and a post-processing apparatus 400 are serially coupled along a flow direction of a recording sheet. In this arrangement, the image forming apparatus 100 is assigned to form an image on either one of obverse and reverse surfaces or one of regions of a page of a recording sheet. The intermediate processing apparatus 200 is configured to perform intermediate processing such as reversing of the recording sheet, on which an image is formed by the image forming apparatus 100, and to supply the recording sheet to the image forming apparatus 300 at the subsequent stage. The image forming apparatus 300 is assigned to form an image on either one of the obverse and reverse surfaces or one of the regions of the recording sheet subjected to the intermediate processing by the intermediate processing apparatus 200. The post-processing apparatus 400 is configured to perform various kinds of post-processing (punching processing, staple processing, binding processing and the like) for the recording sheet on which images are formed by the image forming apparatuses 100 and 300.

According to such an image forming system, the reversing of a recording sheet by the intermediate processing apparatus 200 disposed on the way enables each of the two image forming apparatuses 100 and 300 to form an image on either one of obverse and reverse surfaces of a recording sheet, whereby high-speed output can be attained.

In addition to the above-mentioned different assignment of the obverse and reverse surfaces of a recording sheet, the image forming apparatuses 100 and 300 may be assigned differently to form images on respective different regions such as upper and lower regions or right and left regions on the same page of a recording sheet. Further, the image forming apparatuses 100 and 300 may be assigned differently to form images with respective different colors such as ordinary colors and specific colors on the same page of a recording sheet. Furthermore, the image forming apparatuses 100 and 300 may be assigned differently to form respective different gradation images such as characters (monochromatic image) and images (gradation image) on the same page of a recording sheet.

Hereafter, with reference to FIGS. 1 and 3, description will be given for the detail structure of each apparatus in an image forming system of a series tandem type.

Here, a specific example is shown in the case when the image forming apparatus 100 acts as a master machine with a leadership and the image forming apparatus 300 acts as a slave machine subordinate to the master machine. However, the relationship between this master machine and slave machine may be reversed.

The image forming apparatus 100 and the image forming apparatus 300 are coupled to each other and assigned differently to act respective roles of master and slave. However, the image forming apparatus 100 and the image forming apparatus 300 are basically in a combination of stand-alone image forming apparatuses of the same kind.

A transmission line 50 is a high speed transmission line to connect among respective apparatuses in the image forming system. Various commands and image data are transferred through this transmission line 50. Respective apparatuses are coupled to the transmission line 50 with connectors so that a conduction state is established among the respective apparatuses. It may be desirable for the transmission line 50 to have a data transfer capability and a data bandwidth necessary for transferring image data between the image forming apparatus 100 and the image forming apparatus 300. The transmission line 50 is used for communication among the image forming apparatus 100, the image forming apparatus 300, the intermediate processing apparatus 200, and the post-processing apparatus 400 which are coupled so as to constitute the image forming system. Accordingly, since the distance to transfer data is short, a high speed communication may be easily realized.

The image forming apparatus 100 includes a control section 101, a communicating section 102, an operation display section 105, a storage section 130, an image processing section 140, and an image forming section 150. The control section 101 is configured to control respective sections in the image forming apparatus 100. The communicating section 102 is used to communicate with other apparatus via the transmission line 50 and external communication networks (non-illustrated). The operation display section 105 is configured to allow a user to conduct input operations and to display the state of the image forming apparatus 100. The storage section 130 includes HDDs and the like in order to store image data at the time of image formation and various data. The image processing section 140 is configured to execute various kinds of image processing necessary for image formation. The image forming section 150 is configured to perform image formation based on image formation commands and image data.

The intermediate processing apparatus 200 includes a control section 201, a communicating section 202, and an intermediate processing section 205. The control section 201 is configured to control respective sections in the intermediate processing apparatus 200. The communicating section 202 is used to communicate with the image forming apparatus 100 and the image forming apparatus 300 which are other parties for processing. The intermediate processing section 205 is configured to perform intermediate processing such as reversing of a recording sheet for the recording sheet, on which an image is formed by the image forming apparatus 100 at the precedent stage, such that the recording sheet is made to a proper state to form another image on its reverse surface by the image forming apparatus 300 at the subsequent stage. In this structure, in the case when the intermediate processing section 205 is directly operated by control from the image forming apparatus 100 or the image forming apparatus 300, the control section 201 may be omitted.

The image forming apparatus 300 includes a control section 301, a communicating section 302, an operation display section 305, a storage section 330, an image processing section 340, and an image forming section 350. The control section 301 is configured to control respective sections in the image forming apparatus 300. The communicating section 302 is used to communicate with other apparatus via the transmission line 50 and external communication networks (non-illustrated). The operation display section 305 is configured to allow a user to conduct input operations and to display the state of the image forming apparatus 300. The storage section 330 includes HDDs and the like in order to store image data at the time of image formation and various data. The image processing section 340 is configured to execute various kinds of image processing necessary for image formation. The image forming section 350 is configured to perform image formation based on image formation commands and image data.

The post-processing apparatus 400 includes a control section 401, a communicating section 402, and a post-processing section 405. The control section 401 is configured to control respective sections in the post-processing apparatus 400. The communicating section 402 is used to communicate with respective apparatuses. The post-processing section 405 is configured to perform various kinds of post-processing (punching processing, staple processing, binding processing, and the like) in accordance with control by the control section 401 for recording sheets on which images are formed by the image forming apparatus 100 and the image forming apparatus 300. In this structure, in the case when the post-processing section 405 is directly operated by control from the image forming apparatus 100 or the image forming apparatus 300, the control section 401 may be omitted.

<Operations in the Image Forming Apparatuses and the Image Forming System>

Figure 6:
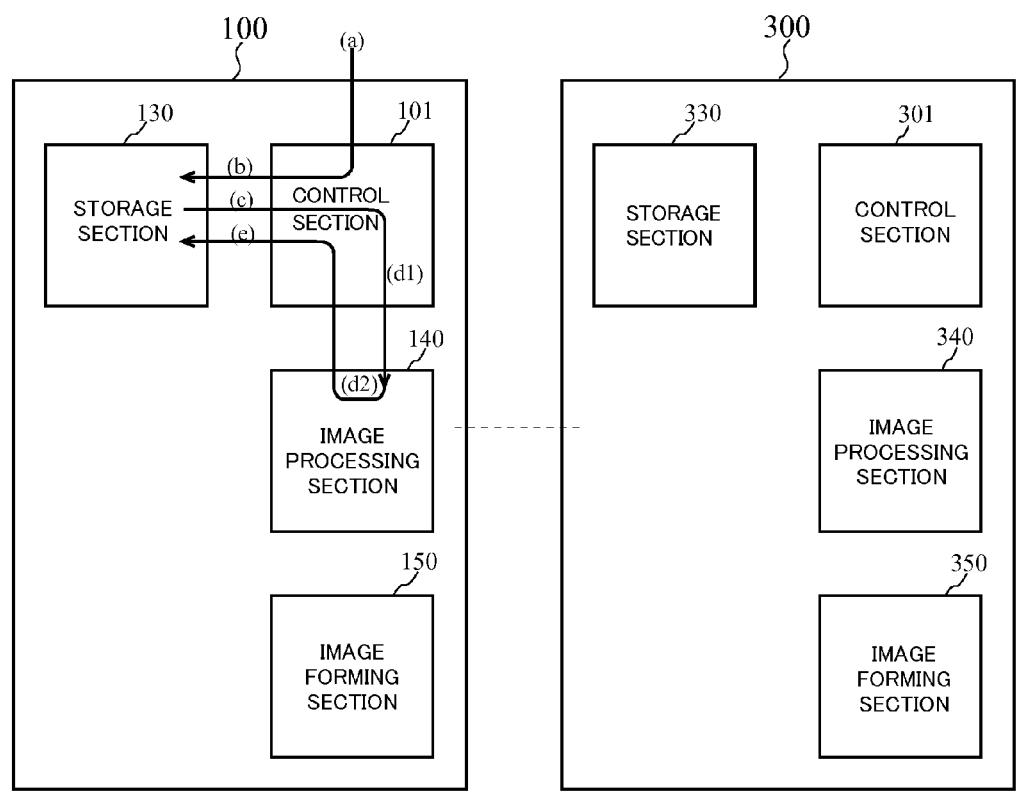
FIG. 6 is an explanatory drawing showing an operation state of the image forming apparatus in the embodiment of the present invention.
Figure 7:
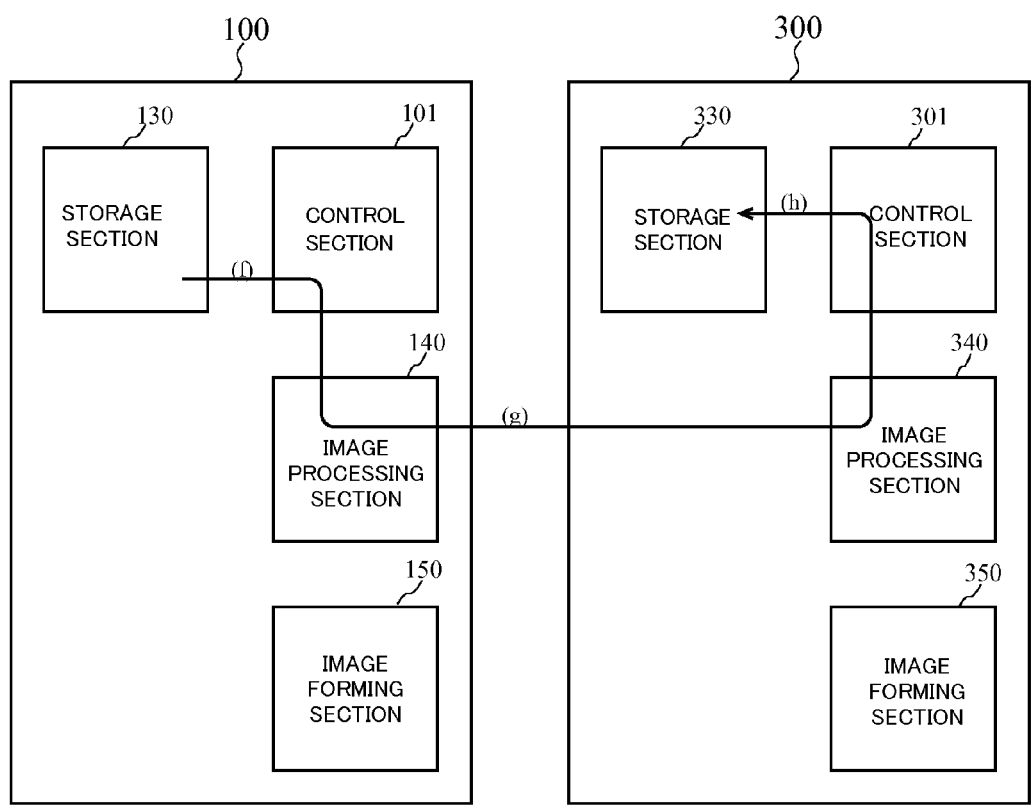
FIG. 7 is an explanatory drawing showing an operation state of the image forming apparatus in the embodiment of the present invention.
Figure 8:
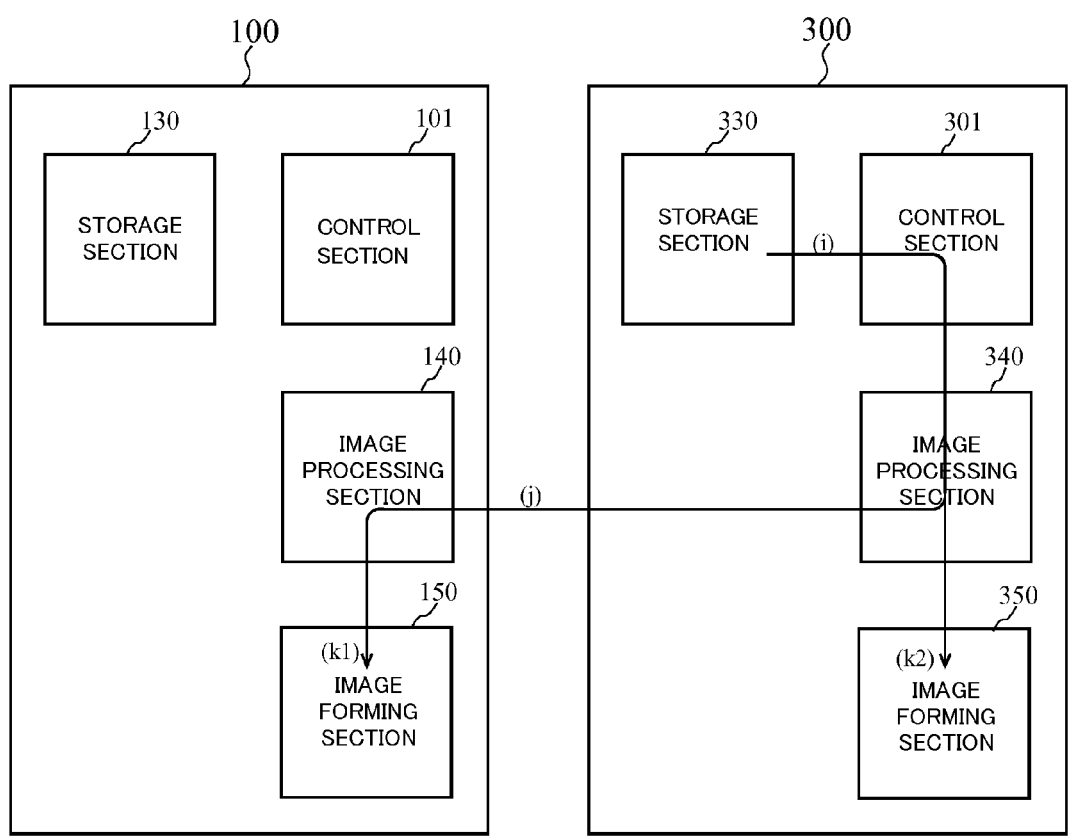
FIG. 8 is an explanatory drawing showing an operation state of the image forming apparatus in the embodiment of the present invention.

Hereafter, with reference to the flow chart in FIG. 5 and the explanatory drawings for a data flow in FIGS. 6 to 8, operations in the embodiment of the image forming system will be explained. In FIGS. 6 to 8, in order to make the data flow to be understood easily, only portions needed for explanation are illustrated.

Figure 5:
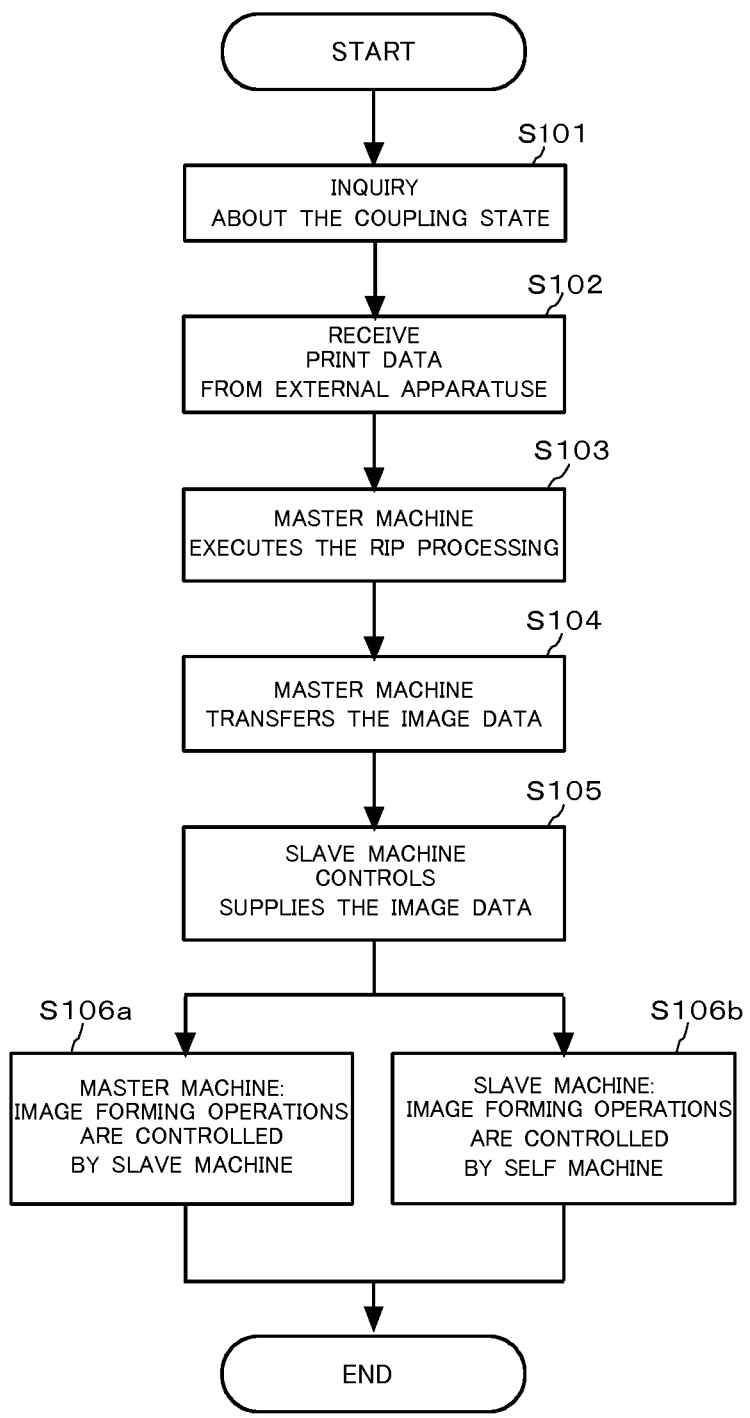
FIG. 5 is a flow chart showing operations of the image forming apparatus in the embodiment of the present invention.

First, when the image forming apparatus 100 is coupled to other apparatuses such as the intermediate processing apparatus 200, the image forming apparatus 300, and the post-processing apparatus 400, the control section 101 inquires about the coupling state for the respective control sections of other apparatuses (Step S101 in FIG. 5). Similarly, when the image forming apparatus 300 is coupled to other apparatuses such as the intermediate processing apparatus 200, the image forming apparatus 100, and the post-processing apparatus 400, the control section 301 inquires about the coupling state for the respective control sections of other apparatuses.

Upon receipt of the inquiry about the coupling state, as a response, the respective control sections of the other apparatuses notify of type information indicating that what type of apparatus a self apparatus is and information about a coupling state indicating that which apparatus is coupled to an input side or an output side of a self apparatus. In this case, in the respective apparatuses of the image forming system, the connector of each of the respective communicating sections is connected to the transmission line, and a sheet input section and a sheet output section are coupled mechanically to each other for passage of a recording sheet. Accordingly, from these connections, it may be possible to acknowledge the other apparatuses coupled at the input side and the output side of the self apparatus.

This inquiry about the coupling state is performed at a timing when the image forming apparatus 100 and the image forming apparatus 300 are coupled to each other, or at a timing when a power source is turned on in each of the image forming apparatus 100 and the image forming apparatus 300 which has been already coupled to each other.

Here, when a user performs operations on the operation display section 105, the control section 101 declares the image forming apparatus 100 as a master machine against the other apparatuses. Further, in addition to the declaration of the master machine, the control section 101 gives the control section 301 an instruction to designate the image forming apparatus 300 as a slave machine, and makes a preparation to receive print data not subjected to the RIP processing from the outside.

In another situation, when print data not subjected to the RIP processing are transmitted from the outside to the image forming apparatus 100, the control section 101 declares the image forming apparatus 100 as a master machine against the other apparatuses. Further, in addition to the declaration of the master machine, the control section 101 gives the control section 301 an instruction to designate the image forming apparatus 300 as a slave machine, and displays an operation menu on the operation display section 105 for a user.

Similarly, when a user performs operations on the operation display section 305, or when print data not subjected to the RIP processing are transmitted from the outside to the image forming apparatus 300, the control section 301 declares the image forming apparatus 300 as a master machine against the other apparatuses. Further, in addition to the declaration of the master machine, the control section 301 gives the control section 101 an instruction to designate the image forming apparatus 100 as a slave machine.

Moreover, the master machine and the slave machine may be determined by any methods other than the above methods. For example, it may be possible to designate as a master machine a predetermined apparatus located at an upstream position or a downstream position in a coupling position in the image forming system. Further, in the case when setup and confirmation with regard to a master machine and a slave machine have been already completed in the image forming system, processing is started from Step 102 described below.

Hereafter, on the presupposition that the image forming apparatus 100 is a master machine (recited as "first image forming apparatus" in claims) and the image forming apparatus 300 is a slave machine (recited as "second image forming apparatus" in claims), the description of the embodiment will be continued.

First, the image forming apparatus 100 acting as a master machine receives (Step S102 in FIG. 5, Flow (b) in FIG. 6) print data (Flow (a) in FIG. 6) not subjected to the RIP processing from external apparatuses such as a print instructing apparatus (non-illustrated). Here, the term "Flow" represents a data flow in FIG. 6. The received print data not subjected to the RIP processing are stored (Flow (b) in FIG. 6) in the storage section 130 in a unit of a job in accordance with an instruction from the control section 101. A unit of a job means a unit of image formation in a series of image formation from a start page to an end page in image formation.

Then, the control section 101 reads out (Flow (c) in FIG. 6) print data not subjected to the RIP processing from the storage section 130, executes the RIP processing for the print data so as to produce image data (Step S103 in FIG. 5, Flow (d1) in FIG. 6). Successively, the image data produced by the RIP processing under the control of the control section 101 are subjected (Flow (d2) in FIG. 6) to compression processing in the image processing section 140, and the image data subjected to the compression processing are stored in the storage section 130 (Flow (e) in FIG. 6).

As described above, image data are produced from the print data which are not subjected to the RIP processing and received from the external apparatus, the produced image data are subjected to the compression processing, and then the processed image data are stored in the storage section 130. Successively, at a time point when the image data are stored in the storage section 130, the control section 101 transmits a notice of completion of the RIP processing to the control section 301.

Upon receipt of the notice of completion of the RIP processing, the control section 301 confines whether or not the preparation of processing at the image forming apparatus 300, such as the storage section 330 has been made. When the control section 301 confirms that the preparation of processing at the image forming apparatus 300 has been made, the control section 301 transmits a notice of an image data transfer request to the control section 101.

Upon receipt of the notice of an image data transfer request, the control section 101 reads out the image data stored in the storage section 130 in a unit of a job, and transfers the image data to the image forming apparatus 300 via the transmission line 50 (Step S104 in FIG. 5, Flow (f) and Flow (g) in FIG. 7). The control section 301 controls the storage section 330 so as to store the image data transferred from the image forming apparatus 100 in a unit of a job (Flow (h) in FIG. 7). Namely, the image data produced by the RIP processing are transferred from the image forming apparatus 100 acting as a master machine to the image forming apparatus 300 acting as a slave machine.

Here, when an instruction of image formation start is input in the operation display section 105 by a user, the control section 101 notifies the control section 301 of the input of the instruction of image formation start and the state of the image forming section 150. Upon receipt of the notice of the instruction of image formation start from the control section 101, the control section 301 confirms whether the image forming section 350 can form images.

If the image forming section 150 and the image forming section 350 are in the state capable of forming images, the control section 301 grasps the state of the image forming section 150 and the image forming section 350, and reads out the image data from the storage section 330 (Flow (i) in FIG. 8). Then, the control section 301 supplies the image data to form images on surfaces or regions of an recording sheet to the image forming section 150 and the image forming section 350 at respective proper timings to form images on the recording sheet passing through the image forming section 150 and the image forming section 350 (Step S105 in FIG. 5, Flow (j) in FIG. 8.

Namely, at the image forming apparatus 300, i.e., at the slave machine, the image data are controlled to be supplied to the image forming apparatus 100 and the image forming apparatus 300 which are coupled in tandem, and image forming operations are controlled. Accordingly, the image forming section 150 at the image forming apparatus 100 being at the master machine forms images (Step S106*a* in FIG. 5, Flow (k1) in FIG. 8) in accordance with the control of the control section 301 based on the image data (Flow (j) in FIG. 6) which are read out from the storage section 330 and transferred by the control section 301.

Also, the image forming section 350 in the image forming apparatus 300 being the slave machine forms images (Step S106*b* in FIG. 5, Flow (k2) in FIG. 8) in accordance with the control of the control section 301 based on the image data which are read out from the storage section 330 and provided by the control section 301.

Figure 9:
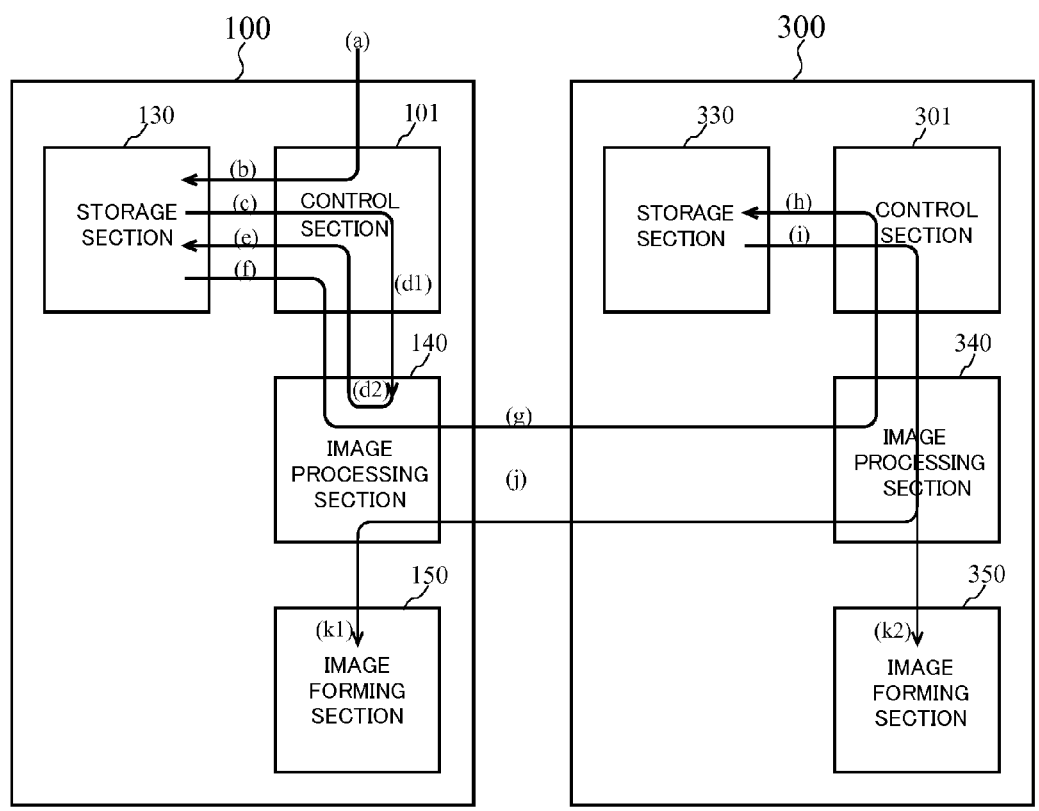
FIG. 9 is an explanatory drawing showing an operation state of the image forming apparatus in the embodiment of the present invention.

In the above-mentioned FIGS. 6 to 8, each state of image forming operations in the image forming apparatus 100 and the image forming apparatus 300 is shown independently for easy comprehension. Actually, in the image forming apparatus 100 and the image forming apparatus 300, there may exist the case where, at a timing when image formation is performed based on image data for a certain job, print data not subjected to the RIP processing for the next job are received and subjected to the RIP processing. FIG. 9 shows such a state that at a timing when image formation is performed for a certain job, the RIP processing is executed for the next job.

Since the processing at each of Flow (a) to Flow (k1) and Flow (k2) in FIG. 9 is the same with the processing at each of Flow (a) to Flow (k1) and Flow (k2) in FIGS. 6 to 8 respectively, overlapped descriptions are omitted.

Similarly, in the case shown in FIG. 9, as same as the case shown in FIGS. 6 to 8, an image forming apparatus 100 acting as a master machine is in charge of the RIP processing and produces image data, and another image forming apparatus 300 acting as a slave machine controls supply of image data to each of image forming apparatuses in synchronization with respective output timings in tandem image formation.

Namely, the RIP processing and the control of supply of image data are separately handled by the image forming apparatus 100 and the image forming apparatus 300. Accordingly, if the timing of the RIP processing overlaps with the timing of the control of supply of image data, the capability of image formation does not decrease depending on the transfer speed and processing capability of the storage section. Further, in the storage section 130 and the storage section 330, there is no need to install additional HDDs.

Effects Obtained by the Embodiments

According to the above-mentioned embodiments, the effects shown in the following items (1) to (3) can be obtained.

(1) In an image forming system which executes RIP processing for print data not subjected to the RIP processing so as to produce image data and forms images based on the image data, a plurality of image forming apparatuses are coupled in tandem in order to be assigned to form images separately one of regions of an recording sheet, wherein the plurality of image forming apparatuses include first and second image forming apparatuses, the first image forming apparatus is assigned to execute RIP processing to produce image data, and the second image forming apparatus is assigned to control supply of the image data to each of the plurality of image forming apparatuses in synchronization with output timings in tandem image formation. Accordingly, the RIP processing and the control of supply of the image data are handled by respective different image forming apparatuses. Therefore, if the timing of the RIP processing overlaps with the timing of the control of supply of image data, the image formation capability of the image forming system does not decrease due to the transfer speed and processing capability of the storage section.

(2) In the above item (1), the image data subjected to the RIP processing are transferred from the first image forming apparatus to the second image forming apparatus in a unit of a job being a unit of image formation in a series of image formation. Accordingly, the frequency of occurrence of transfer of the image data subjected to the RIP processing becomes low. Therefore, the probability that the RIP processing in the first image forming apparatus and the control of supply of image data in the second image forming apparatus are influenced by the transfer of image data subjected to the RIP processing, is small. As a result, if the timing of the RIP processing overlaps with the timing of the control of supply of image data, the image formation capability of the image forming system does not decrease due to the transfer speed and processing capability of the storage section.

(3) In the above item (1) or (2), the second image forming apparatus, which is different from the first image forming apparatus configured to execute the RIP processing, is configured to storage the image data produced by the RIP processing, to read out the image data of a page corresponding to a timing of image formation of each image forming apparatus from the storage section, and to supply the read-out image data to each image forming apparatus. Accordingly, if the timing of the RIP processing overlaps with the timing of the control of supply of image data, respective different storage sections are used such that the storage section 130 is used for the RIP processing (refer to FIG. 6) and the storage section 330 is used for the control of supply of image data (refer to FIG. 8). Therefore, the image formation capability does not decrease due to the data transfer speed of the storage section and the transmission line and the processing capability of each section.

Another Embodiment (1)

In the image forming apparatus 100 and the image forming apparatus 300, the assignment of the master machine and the slave machine should not be limited to the above specific example, and various modifications may be possible.

Further, instead of the master-servant relationship of the master machine and the slave machine, the image forming apparatus 100 and the image forming apparatus 300 may be provided with a fifty-fifty relationship, and assigned differently to the RIP processing and the control of supply of image data.

Furthermore, even in an image forming system in which three or more image forming apparatuses are coupled, any two image forming apparatuses of them may be assigned differently to the RIP processing and the control of supply of image data.

Another Embodiment (2)

In the above-mentioned embodiments, the description is made on the assumption that each of the image forming apparatuses is an electrophotographic type image forming apparatus. However, as long as image forming apparatuses are used in the image forming system of a tandem type, the present invention may be applied to the image forming apparatuses of various types other than the electrophotographic type.

Further, the tandem image forming system is not limited to a combination of image forming apparatuses of the same type. That is, the tandem image forming system may be structured so as to couple various different type image forming apparatuses which have a similar function or performance and are able to be coupled to each others, and the operations described in the above embodiments may be performed in the tandem image forming system.

What is claimed is:

1. An image forming system configured to execute Raster Image Processor processing for print data not subjected to the Raster Image Processor processing so as to produce image data, and to form an image based on the image data, comprising:
   a plurality of image forming apparatuses which are coupled in tandem, and each of which is assigned to form an image on one of regions of an recording sheet, wherein the plurality of image forming apparatuses include first and second image forming apparatuses, the first image forming apparatus is configured to execute the Raster Image Processor processing for the print data not subjected to the Raster Image Processor processing so as to produce the image data, and the second image forming apparatus is configured to supply the image data produced by the Raster Image Processor processing in the first image forming apparatus to each of the plurality of image forming apparatuses in synchronization with a timing of image formation in each of plurality of image forming apparatuses.

2. The image forming system according to claim 1, wherein the image data produced by the Raster Image Processor processing in the first image forming apparatus are transferred from the first image forming apparatus to the second image forming apparatus in a unit of a job being a unit of image formation in a series of image formation.

3. The image forming system according to claim 1, wherein the second image forming apparatus is configured to store the image data produced by the Raster Image Processor processing in a storage section, to read out the image data of a page consistent with a timing to form an image in each of the image forming apparatuses, and to supply the image data to an image forming section of each of the image forming apparatuses.

4. A control method of an image forming system configured to execute Raster Image Processor processing for print data not subjected to the Raster Image Processor processing so as to produce image data, and to form an image based on the image data, wherein the image forming system has a plurality of image forming apparatuses which are coupled in tandem and include first and second image forming apparatuses, and each of which is assigned to form an image on one of regions of an recording sheet, the control method includes the steps of:

executing the Raster Image Processor processing for print data not subjected to the Raster Image Processor processing so as to produce image data by the first image forming apparatus, and supplying the image data produced by the Raster Image Processor processing in the first image forming apparatus to each of the plurality of image forming apparatuses in synchronization with a timing of image formation in each of the plurality of image forming apparatuses by the second image forming apparatus.

5. The control method of the image forming system according to claim 4, further comprising the step of:

transferring the image data from the first image forming apparatus to the second image forming apparatus in a unit of a job being a unit of image formation in a series of image formation.

6. The control method of the image forming system according to claim 4, further comprising the step of:

storing the image data produced by the Raster Image Processor processing in the first image forming section in a storage section in the second image forming apparatus;

reading out the image data of a page consistent with a timing to form an image in each of the image forming apparatuses, and supplying the image data to an image forming section of each of the image forming apparatuses.

* * * * *